Nov. 4, 1930.  C. H. MATTHIESSEN, JR  1,780,561
AEROPLANE
Filed July 9, 1928   2 Sheets-Sheet 1

INVENTOR.
Conrad H. Matthiessen Jr
BY
W. F. Bissing
ATTORNEY.

Nov. 4, 1930.   C. H. MATTHIESSEN, JR   1,780,561
AEROPLANE
Filed July 9, 1928   2 Sheets-Sheet 2
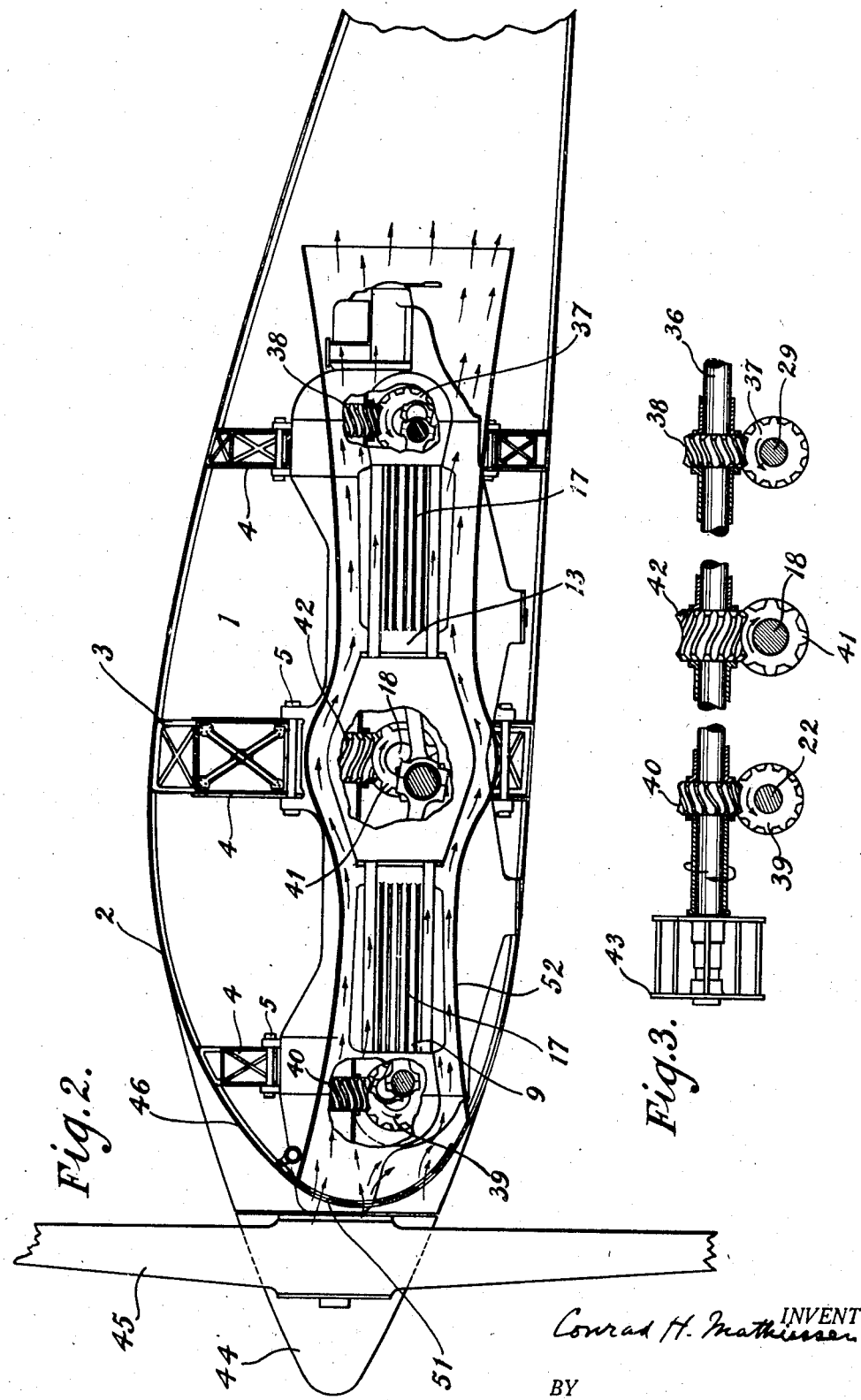
INVENTOR.
Conrad H. Matthiessen Jr
BY
W. F. Bissing.
ATTORNEY.

Patented Nov. 4, 1930

1,780,561

UNITED STATES PATENT OFFICE

CONRAD H. MATTHIESSEN, JR., OF NEW YORK, N. Y.

AEROPLANE

Application filed July 9, 1928. Serial No. 291,228.

My invention relates to aeroplanes, particularly to an aeroplane construction in which a slide valve engine is used to drive the aeroplane, the cylinders of which engine are supported along the wing and preferably within the wing and are arranged within the line of flight and extend substantially parallel to the longitudinal axis of the aeroplane at right angles to the propeller. In the preferred form of the invention a harmony drive shaft is provided, which serves as a driving connection to the valve shaft, the latter being driven at half speed with relation to the engine crankshaft. This harmony drive shaft is mounted parallel to the longitudinal axis of the aeroplane at right angles to the propeller and drives the propeller of the aeroplane by the power transmitted to it by the valve shaft, and engine crankshaft.

One of the objects of the invention is to drive the propeller of the aeroplane by means of the harmony drive shaft, which is parallel to the longitudinal axis of the aeroplane, by means of power transmitted by the valve shaft and engine crankshaft. The engine may be an air-cooled or water-cooled, slide valve internal combustion engine, the cylinders being arranged side by side and extending in the line of flight.

Another object of the invention is to drive the harmony drive shaft by means of worm or spiral gearing, and by suitable change of gearing to drive the shaft and so the propeller at any desired speed, at the same time maintaining the half speed relation of the valve shaft to the engine crankshaft.

Another object of the invention is to space the shaft for driving the propeller from the cylinders, for example arranging the shaft either above or below the cylinders, thereby obtaining the center of thrust higher or lower as may be necessary.

A more particular object of the invention is to combine the cylinders of the engine, when arranged substantially parallel to the longitudinal axis of the aeroplane at right angles to the propeller, with the wing of an aeroplane, so that the cylinders may be supported along, preferably within, the wing of an aeroplane.

With the above and other objects in view, my invention consists in the parts, improvements and combinations more fully pointed out hereinafter.

Turning now to the drawings, which illustrate one embodiment of the invention:

Figure 2, is a side elevation, partly in section, showing the slide valve engine mounted in a wing of an aeroplane, and showing the means for air-cooling the cylinders, the aeroplane being shown with its longitudinal axis parallel to the ground.

Figure 3, is a detail view of the harmony drive shaft and the worm gearing connecting the shaft with the engine crankshaft and the valve shafts of the engine.

Figure 1:
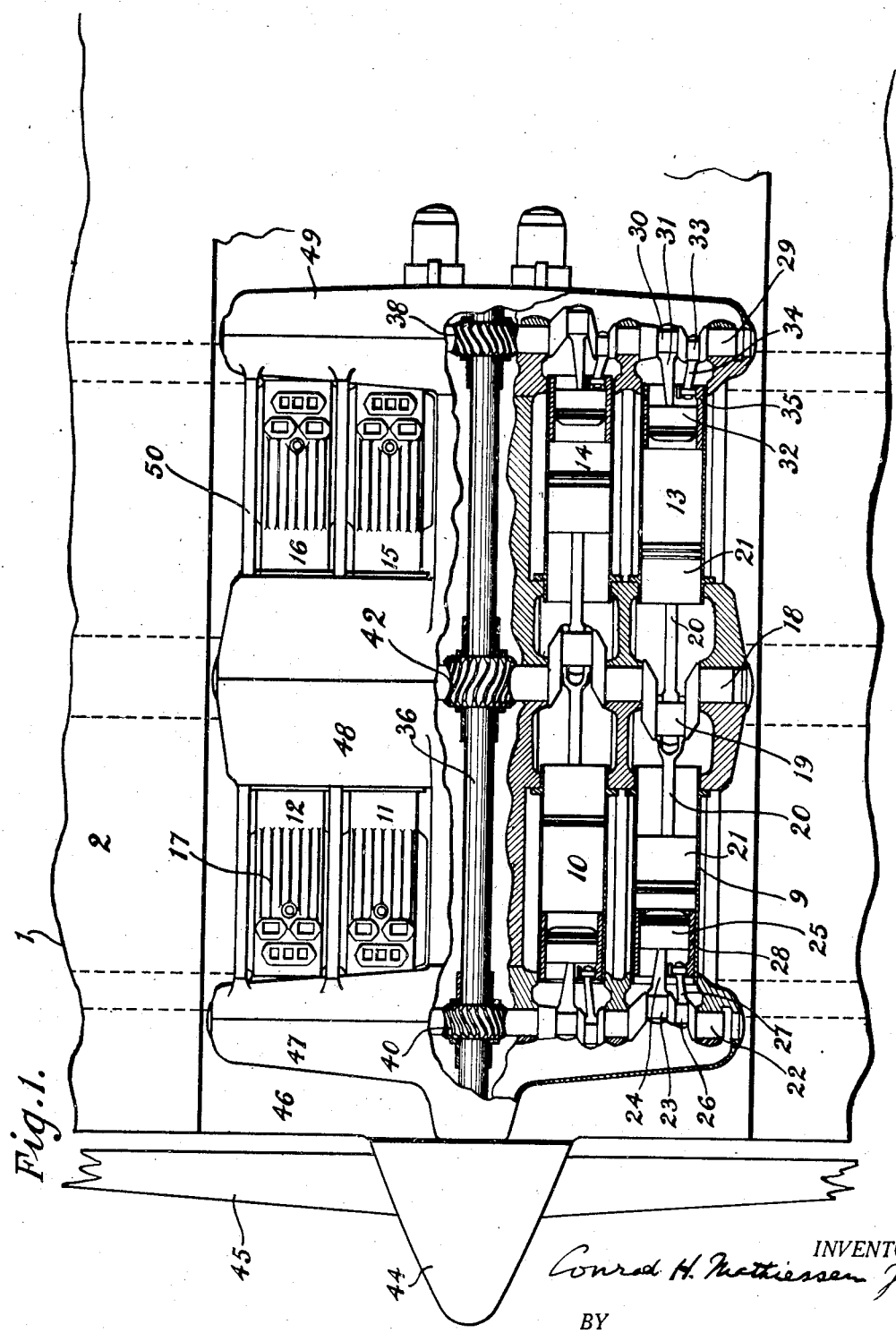
Figure 1, is a top plan view, partly in section showing a double slide valve engine mounted along the wing of an aeroplane.

The aeroplane wing 1, is preferably made of metal and is provided with covering 2. It is equipped with the usual ailerons (not shown). The wing may be embodied in a monoplane or multiplane. In a monoplane, the wing may be mounted above or below or midway of the fuselage.

The engine is a slide valve internal combustion engine like that shown in Patents Nos. 1,492,573 and 1,617,019 to C. H. Matthiessen, Jr., in which both the valve shaft and the engine crankshaft develop power.

As shown in Figure 2, the engine is preferably mounted in a wing of the aeroplane.

The wing is provided with the usual spars 3 and struts (not known). Brackets 4, are also provided in the wing to take up the thrust of the engine and to support the engine, the engine being supported from the brackets by means of bolts 5, passing through the respective brackets and engine casings.

The wing is preferably made metallic to avoid the danger of burning the wing by an air-cooled engine. Or that part of the wing along which the engine is mounted may be made of metal and the rest of the wing may be made of wood.

In the form of the invention illustrated, the engine is a double slide valve internal combustion engine, that is, two sets of cylinders are provided having a single crankshaft, each set of cylinders has its valve shaft. In the preferred form, the cylinders are arranged in the line of flight, parallel to the longitudinal axis of the aeroplane and at right angles to the propeller.

In the form shown, the double, slide valve engine, comprises a forward set of cylinders 9, 10, 11, 12, and a rear set 13, 14, 15, 16. The cylinders are preferably provided with heat radiating fins 17, so that, an air-cooled engine being shown, cooling air may be passed to the cylinders.

By arranging the cylinders parallel to the longitudinal axis of the aeroplane and mounting the engine along and preferably within the wing of an aeroplane, a compact structure is obtained. The air resistance offered by the engine and its cowling is thus reduced.

As shown engine crankshaft 18, extends between the two sets of cylinders, transversely of the longitudinal axis of the aeroplane, said shaft extending in a substantially horizontal plane when the aeroplane is in starting position on the ground. The crankshaft carries a plurality of cranks 19, and connecting rods 20, one for each cylinder of the engine, which cranks and connecting rods are reciprocated by the working piston 21, in each cylinder (see Fig. 1).

Mounted in front of the heads of the forward set of cylinders is a transverse valve shaft 22, which extends parallel to the crank shaft and carries a plurality of cranks 23 and connecting rods 24, one each for each forward cylinder, for reciprocating the plug 25 of each cylinder, and a plurality of cranks 26 and connecting rods 27, for reciprocating the sleeve valve 28 of each forward cylinder.

Mounted in the rear of the heads of the rear set of cylinders is another transverse valve shaft 29, which also extends parallel to the crank shaft and carries a plurality of cranks 30 and connecting rods 31, for reciprocating the plug 32 of each rear cylinder, and a plurality of cranks 33 and connecting rods 34, for reciprocating the sleeve valve 35, of each of the rear cylinders.

As illustrated, the shaft for driving the propeller is preferably the harmony drive shaft, which serves as a driving connection with the front and rear valve shaft, which are always driven at half speed with relation to the engine crankshaft. Both valve shafts and the engine crankshaft develop and transmit power to the harmony drive shaft, which drives the propeller of the aeroplane.

As shown, the harmony drive shaft 36, is spaced apart from and is preferably mounted above the engine cylinders, parallel thereto. This shaft, however, for example, may be mounted below the engine cylinders depending upon the desired center of thrust.

Means are provided for driving the harmony drive shaft, and so the propeller, at any desired speed, at the same time always maintaining the half-speed relation between the valve shafts and the engine crankshaft.

In the form shown, the valve shafts and the engine crankshaft, all of which develop power, are geared to and drive shaft 36, at any desired speed, by means of worm gearing.

The rear valve shaft 29, carries a worm 37, which is engaged by worm wheel 38, secured to shaft 36, and forward valve shaft 22, carries a worm 39, which is engaged by worm wheel 40, also secured to shaft 36. The engine crankshaft 18, carries a worm 41, which is engaged by worm wheel 42, secured to shaft 36.

It will be seen that in the form of the invention shown both valve shafts 22 and 29, are driven in a counter-clockwise direction, while the engine crankshaft 18, is driven in a clockwise direction. Accordingly, the teeth of worm 41 run in the opposite direction to the teeth of worms 37 and 39, so that shaft 36 may be driven in the same direction by the engine crankshaft and the valve shafts. By proper selection of gearing shaft 36 may be driven at any desired speed, while the half speed relation between the valve shafts and the crankshaft may be maintained.

Means are provided for driving the aeroplane from the harmony drive shaft.

In the form illustrated, the propeller hub 43, is carried by the forward end of the harmony drive shaft 36. A propeller spinner 44, is carried by and encases the hub as usual, and rotates with the propeller. The propeller blades 45, are secured to and rotate with the hub, so as to drive the aeroplane.

The form illustrated, showing the propeller mounted forward of the shaft 36 and the wing, is the "puller" method of driving. It will be understood that the propeller may be mounted on the rear of the shaft, so as to employ the "pusher" method of driving. Or two propellers may be used, one foward and one to the rear of the shaft, and both "puller" and "pusher" methods of driving the aeroplane employed.

Means are provided for passing air across the cylinders of the engine.

As shown, the engine is provided with suitable cowling 46, which has a central portion which meets the propeller spinner 44, so as to form a streamline. A compact structure is thus obtained, which reduces the air resistance offered by the engine.

The engine is provided with casings 47, 48 and 49, and with studs 50, which connect the casings together, thus leaving the cylinders exposed to the air currents. The front of the engine cowling is provided with openings at 51, for the admission of air, which is guided along the cylinders by means of deflecting plates 52.

Having thus described the construction, the operation will be clear. It will be understood that changes may be made in carrying the invention into effect, without departing from the principle thereof.

What I claim is:

1. In an aeroplane the combination with a wing and the propeller of an aeroplane, of of a slide valve engine, whose cylinders lie in the line of flight substantially parallel to the longitudinal axis of the aeroplane, the engine being provided with a crankshaft and a valve shaft, said crankshaft extending in a substantially horizontal plane when the aeroplane is in starting position on the ground, and a shaft extending parallel to the longitudinal axis of the aeroplane and geared to the engine crankshaft and valve shaft, the propeller being secured to said shaft.

2. In an aeroplane the combination with a wing and propeller of an aeorplane, of a slide valve engine, said engine being provided with cylinders, a crankshaft and a valve shaft, both of said shafts adapted to develop power, and a harmony drive shaft, geared to the crankshaft and a valve shaft, the propeller being secured to the harmony drive shaft, said engine cylinders extending at right angles to the propeller.

3. In an aeroplane the combination with a wing and propeller of an aeroplane, of a slide valve engine, whose cylinders lie in the line of flight substantially parallel to the longitudinal axis of the aeroplane, said engine being provided with a crankshaft and a valve shaft, and a harmony drive shaft extending parallel to the longitudinal axis of the aeroplane and geared to the crankshaft and valve shaft, the propeller being secured to said harmony drive shaft.

4. In an aeroplane the combination with a wing and propeller of an aeroplane, of a slide valve engine, whose cylinders lie in the line of flight substantially parallel to the longitudinal axis of the aeroplane, said engine being provided with a crankshaft and a valve shaft, and a harmony drive shaft geared to the crankshaft and valve shaft, said harmony drive shaft extending parallel to the longitudinal axis of the aeroplane and being spaced from said cylinders, the propeller being secured to said shaft.

5. In an aeroplane, the combination with a wing and propeller of an aeroplane, of a slide valve engine, whose cylinders lie in the line of flight, parallel to the longitudinal axis of the aeroplane, said engine being provided with a crankshaft and a valve shaft, a harmony drive shaft extending parallel to the cylinders, worm gears for gearing the drive shaft to the crankshaft and valve shaft of the engine, the propeller being secured to said harmony drive shaft.

6. In an aeroplane the combination with a wing and propeller of a slide valve engine, whose cylinders lie parallel to the longitudinal axis of the aeroplane, said engine being provided with a crankshaft and a valve shaft, both of which are adapted to develop power, a harmony drive shaft, geared to said crankshaft and valve shaft, mounted above the engine cylinders, the propeller being secured to said shaft.

7. In an aeroplane the combination with a wing and propeller of a slide valve engine provided with a plurality of sets of cylinders, some of which lie substantially parallel to the longitudinal axis of the aeroplane, said engine being provided with a crankshaft and a valve shaft for each set of cylinders, said crankshaft and valve shafts being adapted to develop power, a harmony drive shaft geared to said crankshaft and valve shafts, the propeller being secured to said harmony drive shaft.

8. In an aeroplane the combination with a wing and propeller of a double slide valve engine including two sets of cylinders, said engine being provided with a crankshaft and a valve shaft for each of said sets of cylinders, said crankshaft and valve shafts being adapted to develop power, a harmony drive shaft geared to said crankshaft and valve shafts, the propeller being secured to said shaft, the engine cylinders extending at right angles to the propeller.

9. In an aeroplane the combination with a wing and propeller of an aeroplane, of an air-cooled, slide valve engine, whose cylinders lie in the line of flight, substantially parallel to the longitudinal axis of the aeroplane, said engine being provided with a crankshaft and a valve shaft, a harmony drive shaft, geared to the crankshaft and valve shaft, extending parallel to the longitudinal axis of the aeroplane, the propeller being secured to said shaft, cowling enclosing said cylinders, and means for permitting air to flow to and cool the engine cylinders.

10. In an aeroplane the combination with a wing and propeller of an aeroplane, of a slide valve engine, whose cylinders lie parallel to the longitudinal axis of the aeroplane, said engine being provided with a crankshaft and a valve shaft, a harmony drive shaft geared to said crankshaft and valve shaft, the propeller being secured to said harmony drive shaft, and means for mounting the engine along the wing of an aeroplane.

11. In an aeroplane the combination with a wing and propeller of an aeroplane, of a slide valve engine whose cylinders lie parallel to the longitudinal axis of the aeroplane, said engine being provided with a crankshaft and a valve shaft, a harmony drive shaft geared to said crankshaft and valve shaft, the propeller being secured to said harmony drive shaft, and means for mounting the engine within the wing of an aeroplane.

12. In an aeroplane the combination with a wing and propeller of an aeroplane, of a slide valve engine whose cylinders lie in the line of flight, substantially parallel to the longitudinal axis of the aeroplane, said engine being provided with a crankshaft and a valve shaft, a harmony drive shaft, geared to the crankshaft and valve shaft, and extending parallel to the longitudinal axis of the aeroplane, the propeller being secured to said shaft, and means for mounting the engine along a wing of the aeroplane.

13. In an aeroplane the combination with a wing and propeller of an aeroplane, of a slide valve engine, whose cylinders lie in the line of flight, substantially parallel to the longitudinal axis of the aeroplane, said engine being provided with a crankshaft and a valve shaft, a harmony drive shaft, geared to the crankshaft and valve shaft, said shaft extending parallel to the longitudinal axis of the aeroplane and being spaced from said cylinders, the propeller being secured to said shaft, and means for mounting the engine along a wing of the aeroplane.

14. In an aeroplane the combination with a wing and propeller of an aeroplane, of a slide valve engine, whose cylinders lie in the line of flight, parallel to the longitudinal axis of the aeroplane, said engine being provided with a crankshaft and a valve shaft, a harmony drive shaft extending parallel to the cylinders, worm gears for gearing the harmony drive shaft to the crankshaft and valve shaft, the propeller being secured to the harmony drive shaft, and means for mounting the engine, along a wing of the aeroplane.

15. In an aeroplane the combination with a wing and propeller, of a slide valve engine, whose cylinders lie parallel to the longitudinal axis of the aeroplane, said engine being provided with a crankshaft and a valve shaft, both of which are adapted to develop power, a harmony drive shaft geared to said crankshaft and valve shaft, said shaft being mounted above the engine cylinders, the propeller being secured to said shaft, and means for mounting the engine along a wing of the aeroplane.

16. In an aeroplane the combination with a wing and propeller of a slide valve engine provided with a plurality of sets of cylinders, some of which lie substantially parallel to the longitudinal axis of the aeroplane, said engine being provided with a crankshaft, a valve shaft for each set of cylinders, said crankshaft and valve shafts being adapted to develop power, a harmony drive shaft geared to said crankshaft and valve shafts, the propeller being secured to said harmony drive shaft, and means for mounting the engine along a wing of the aeroplane.

17. In an aeroplane the combination with a wing and propeller of a double slide valve engine including two sets of cylinders, said engine being provided with a crankshaft, a valve shaft for each set of cylinders, said crankshaft and valve shafts being adapted to develop power, a harmony drive shaft geared to said crankshaft and valve shafts, the propeller being secured to said harmony drive shaft, and means for mounting the engine along a wing of the aeroplane, with the cylinders extending at right angles to the propeller.

In testimony whereof, I have signed my name to this specification.

CONRAD H. MATTHIESSEN, Jr.